United States Patent
Zheng

(10) Patent No.: US 9,204,377 B2
(45) Date of Patent: Dec. 1, 2015

(54) METHOD AND DEVICE FOR PROXIMITY-BASED COMMUNICATION

(71) Applicant: Industrial Technology Research Institute, Hsinchu (TW)

(72) Inventor: Yan-Xiu Zheng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 132 days.

(21) Appl. No.: 13/936,220

(22) Filed: Jul. 8, 2013

(65) Prior Publication Data

US 2014/0016504 A1    Jan. 16, 2014

Related U.S. Application Data

(60) Provisional application No. 61/671,797, filed on Jul. 16, 2012.

(51) Int. Cl.
    H04W 48/16     (2009.01)
    H04W 76/02     (2009.01)
    H04W 8/00      (2009.01)

(52) U.S. Cl.
    CPC ............. *H04W 48/16* (2013.01); *H04W 8/005* (2013.01); *H04W 76/023* (2013.01)

(58) Field of Classification Search
    CPC ..... H04W 48/16; H04W 8/005; H04W 76/02; H04W 76/023; H04W 8/00
    USPC ......... 370/254, 310, 328, 338, 389, 400, 351, 370/395.1, 395.2; 455/403, 422.1, 435.1
    See application file for complete search history.

(56) References Cited

U.S. PATENT DOCUMENTS

| | | | |
|---|---|---|---|
| 6,347,095 B1 | 2/2002 | Tang et al. | |
| 7,337,217 B2 | 2/2008 | Wang | |
| 8,224,351 B1 | 7/2012 | Sushkov et al. | |
| 2009/0190522 A1 | 7/2009 | Horn et al. | |
| 2009/0323648 A1 * | 12/2009 | Park et al. | 370/338 |
| 2011/0019582 A1 * | 1/2011 | Okmyanskiy et al. | 370/254 |

(Continued)

FOREIGN PATENT DOCUMENTS

| | | |
|---|---|---|
| CN | 101779477 | 7/2010 |
| CN | 102084621 | 6/2011 |

(Continued)

OTHER PUBLICATIONS

Fodor et al., "Design Aspects of Network Assisted Device-to-Device Communications," IEEE Communications Magazine, May 2011, pp. 2-9.

(Continued)

*Primary Examiner* — Obaidul Huq
(74) *Attorney, Agent, or Firm* — Jianq Chyun IP Office

(57) ABSTRACT

Methods and devices for communication in a wireless network are provided. One or more discovery devices transmits a request message for information to one or more target devices and receives an information related to the one or more target devices, so as to establish a communication link between at least a pair of discovery devices and target devices. A discovery period can be designated by the wireless network, and the discovery device can transmit to a server the request message and an information related to the one or more discovery devices prior to the discovery period. The target device can also transmit to the server the information related to the target device prior to the discovery period.

53 Claims, 8 Drawing Sheets

(56) References Cited

U.S. PATENT DOCUMENTS

| | | | |
|---|---|---|---|
| 2011/0106837 A1 | 5/2011 | Walton et al. | |
| 2011/0286403 A1 | 11/2011 | Jain et al. | |
| 2011/0302504 A1 | 12/2011 | Khare et al. | |
| 2012/0300662 A1 | 11/2012 | Wang et al. | |
| 2013/0013926 A1 | 1/2013 | Hakola et al. | |
| 2013/0029712 A1 | 1/2013 | Shao et al. | |
| 2013/0034082 A1 | 2/2013 | Etemad et al. | |
| 2013/0265906 A1* | 10/2013 | Abraham et al. | 370/254 |
| 2013/0303088 A1* | 11/2013 | Watfa et al. | 455/41.2 |

FOREIGN PATENT DOCUMENTS

| | | |
|---|---|---|
| CN | 102379107 | 3/2012 |
| CN | 102958066 | 3/2013 |
| WO | 2012091418 | 9/2012 |
| WO | 2013015623 | 1/2013 |

OTHER PUBLICATIONS

Spizewski, "Device Discovery in Device Management Systems for Cellular Networks," Master's thesis, Mar. 22, 2007, School of Information and Communication Technology, Royal Institute of Technology (KTH).

Janis et al., "Device-to-Device Communication Underlaying Cellular Communications Systems," Int. J. Communications, Network and System Sciences, Mar. 20, 2009, pp. 169-178.

Baccelli et al., "On the Design of Device-to-Device Autonomous Discovery," Fourth International Conference on Communication Systems and Networks (COMSNETS), Jan. 3, 2012, pp. 1-9.

Han et al., "Subchannel and Transmission Mode Scheduling for D2D Communication in OFDMA Networks," IEEE Vehicular Technology Conference, Sep. 3-6, 2012, pp. 1-5.

"Office Action of Taiwan Counterpart Application", issued on Apr. 10, 2015, p. 1-p. 9.

* cited by examiner

METHOD AND DEVICE FOR PROXIMITY-BASED COMMUNICATION

CROSS-REFERENCE TO RELATED APPLICATION

This application claims the priority benefits of U.S. provisional application Ser. No. 61/671,797, filed on Jul. 16, 2012. The entirety of the above-mentioned patent applications is hereby incorporated by reference herein and made a part of this specification.

TECHNICAL FIELD

The technical field relates to a method and device for proximity-based communication.

BACKGROUND

Three approaches may be used to provide proximity-based service nowadays: direct communications, local switching and network-assisted direct communications. Generally speaking, in the direct communication approach, the two parties communicate directly to each other, in which the two devices discover each other and establish a communication link. For the local switching approach, the two parties may communicate through a base station (BS), and in this case, device to device (D2D) communicate through the BS. On the other hand, in network-assisted direct communications, one party communicates with the other through the assistance from a BS. Therefore, the BS assists a device to discover the other device and the two devices establish direct communications.

However, direct communications may be ineffective in providing information which is of interest to the users. Such a user may not be within the coverage area of a point of interests, and the user may not notice another user in proximity.

SUMMARY

One of the exemplary embodiment includes a method for communication in a wireless network, including one or more discovery devices executing at least steps comprising: transmitting a request message for information to one or more target devices; and receiving an information related to the one or more target devices, for establishing a communication link between at least a pair of discovery devices and target devices.

Another exemplary embodiment includes a discovery device, including a communication protocol module transmitting a request message for information to one or more target devices, and receiving an information related to the one or more target devices, for establishing a communication link between at least one pair of discovery devices and target devices.

Another exemplary embodiment includes a method for communication in a wireless network, including one or more target devices executing at least steps comprising: receiving a request message for information; and transmitting to one or more discovery devices an information related to the one or more target devices, for establishing a communication link between at least one pair of discovery devices and target devices.

Another exemplary embodiment includes a method for communication in a wireless network, in which a discovery period is designated by the wireless network, the method including one or more discovery devices transmitting to a server a request message and an information related to the one or more discovery devices prior to the discovery period; and one or more target devices transmitting to the server an information related to the one or more target devices prior to the discovery period.

Another exemplary embodiment includes a discovery device for communication in a wireless network, in which a discovery period is designated by the wireless network. The discovery device includes a communication protocol module transmitting to a server a request message and an information related to the discovery device prior to the discovery period, and transmitting to the server an information related to one or more target devices prior to the discovery period.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
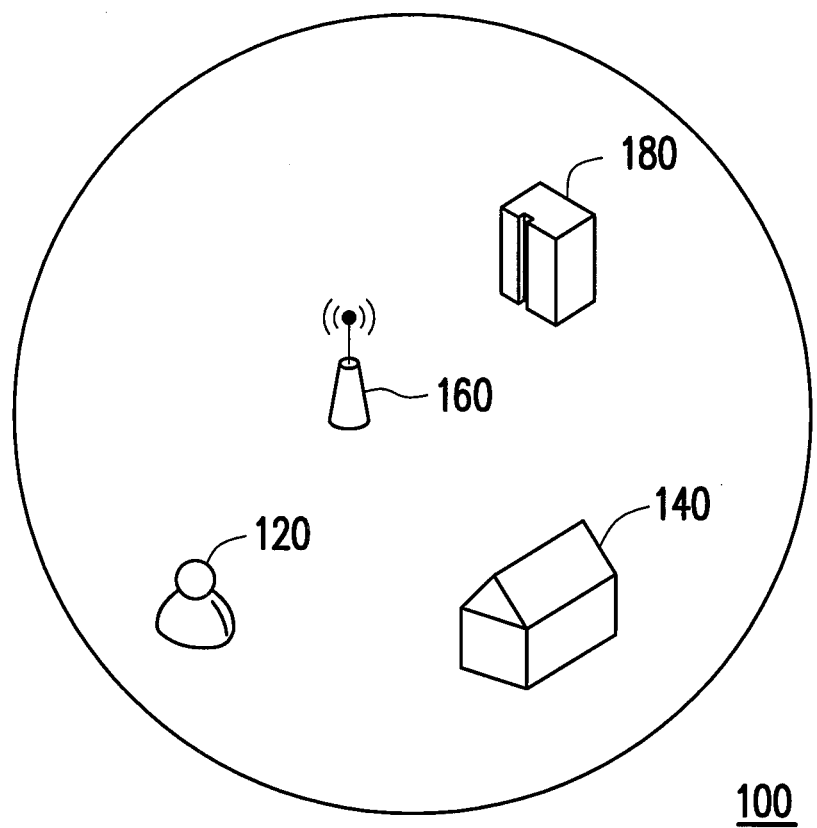
FIG. 1 is a schematic view of an example system implementing a method for communication in a wireless network according to an exemplary embodiment.

FIG. 1 is a schematic view of an example system implementing a method for communication in a wireless network according to an exemplary embodiment. With reference to FIG. 1, a system 100 includes communication devices 120 and 140, one or more intermediate devices 160, and a server 180. The communication devices 120 and 140 may include one or more discovery devices and one or more target devices.

Figure 2:
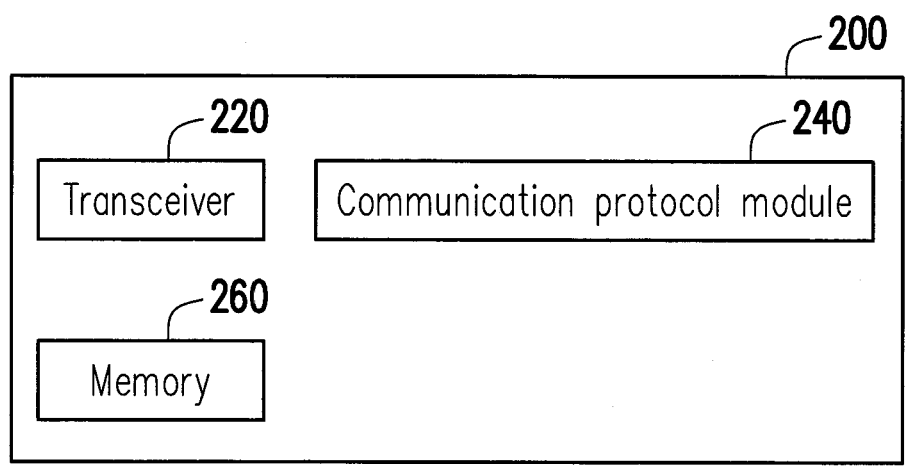
FIG. 2 is a functional block diagram of a device in the system depicted in FIG. 1 according to an exemplary embodiment.

FIG. 2 is a functional block diagram of a device in the system depicted in FIG. 1 according to an exemplary embodiment. In FIG. 2, a device 200 may represent the communication devices 120 and 140, the one or more intermediate devices 160, and the server 180 shown in FIG. 1. The device 200 may include a transceiver 220, a communication protocol module 240, and a memory 260. The transceiver 220 and the memory 260 may be both connected to the communication protocol module 240. The transceiver 220 may be configured to transmit and receive signals from other devices within the coverage range thereof. The transceiver 220 may perform analog-to-digital signal conversion (ADC), digital-to-analog signal conversion (DAC), modulation, demodulation, signal amplification, low-pass filtering, and bandpass filtering. The transceiver 220 is, for example, configured to provide information of a received signal to the communication protocol module 240, modulate data received from the communication protocol module 240 into a modulated signal, and transmit the modulated signal to other devices in the system 100.

The communication protocol module 240 may be configured for receiving a request message from other devices in the system 100 and processing a command in the message (or executing corresponding operations according to parameters in the message). The communication protocol module 240 may include a processor (not drawn) and an embedded software or firmware program. The embedded software or firmware program may include program codes of a communication protocol stack. When the processor of the communication protocol module 240 executes the program codes of the communication protocol stack, the communication protocol module 240 can be configured for executing various procedures in a method for communication in a wireless network, which will be described in the embodiments below accompanied by FIGS. 3-9. In addition, the memory 260 may be configured for temporarily storing parameters or other data used in the procedures. The device 200 may further include other components (not shown), such as an antenna module to accomplish the aforementioned functions of the transceiver 220, the communication protocol module 240, and the memory 260. Other components may also be included in the communication devices 120 and 140, the one or more intermediate devices 160, and the server 180 in accordance with the wireless network implementation of the system 100, such as CDMA, WCDMA, GSM, UMTS, 3G, 4G, WiMAX, LTE, or other suitable implementations.

It should be appreciated that the communication devices 120 and 140, the one or more intermediate devices 160, and the server 180 depicted in FIG. 1 may be a user equipment (UE), a mobile station (MS), an advanced mobile station (AMS), a wireless terminal communication device, a M2M device, or a MTC device. Moreover, the devices may also be a digital television (TV), a digital set-top box, a personal computer (PC), a notebook computer, a tablet computer, a netbook, a mobile phone, a smart mobile phone, a water meter, a gas meter, a watt-hour meter, an alarm, a sensor, or a monitor. These devices may be located in a store, such as the communication device 140 in FIG. 1. Furthermore, the one or more intermediate devices 160 may be base stations (BS), advanced base stations, node B systems, or evolved node Bs (eNBs), for example.

With reference to FIG. 1, in one exemplary embodiment, a method for communication in a wireless network includes one or more target devices (e.g. the communication device 140) registering and uploading an information related to the one or more target devices to the server 180 through the one or more intermediate devices 160. The server 180 may store the information related to the device 140, such as a location information, from the device 160. A user of another device 120 who is interested in information around the proximity of the device 120 may request a proximity information from the server 180 through the device 160. The server 180 receives the request from the device 120 of the user through the device 160, and the server 180 reports the proximity information to the device 120 through the device 160. The user acquires the associated proximity information through the one or more intermediate devices 160. The user is accordingly able to access the device 140 and directly communicate with the device 140.

It should be appreciated that, in other embodiments where there is a communication link between the server 180 and the device 140, the device 140 could transmit and store information related to the device 140 directly to the server 180 without the assistance of the device 160. In another embodiment, the server 180 could also be embedded in the intermediate device 160, for example, and accordingly some of the aforedescribed steps can be merged with each other.

Moreover, the server 180 can further provide points of interest according to a criterion of the proximity information corresponding to the device 120 and the device 140. The proximity criterion may be distance, transmitted power, device category, signed contract, etc. For example, the proximity criteria of device 120 is 100 m and the proximity criterion of the device 140 is 200 m. When both devices 120 and 140 are within 100 m, the devices 120 and 140 may be designated as reachable. The server 180 may report the devices 120 and 140 as points of interest.

In one embodiment, the device 160 may receive information from the device 120 and forwards the information to the server 180. The device 160 may further receive a request for information from the device 120 and forwards the request to the server 180. The device 160 further receives the relevant information from the server 180 and forwards the information to the device 120. In another embodiment, the device 120 sends a request through the device 160 to the server 180 for information related to the point of interest. The point of interest might be a store where the device 140 is located, for example, or some other user equipments. The device 120 receives at least one of point of interest around its proximity, and allows the device 120 to directly communicate with the device 140. In another embodiment, the device 140 registers its relative information through the device 160 to the server 180, allowing the device 140 to directly communicate with the device 120 which is of interest to the device 140. In another embodiment, the server 180 stores the information related to the device 140. The server receives a request for point of interest from the device 120 through the device 160. The server 180 may then feedback at least one point of interest including the device 140 to the device 120. In some embodiments, the method for communication is used in a system across multiple devices 160, in which one of such device 160 may establish communication links for the devices 120 and 140.

However, in some embodiments of the disclosure, the devices 120 and 140 may request for direct communication. Direct request and network-assisted direct request are described in the methods and devices hereafter. In direct request communication methods according to some embodiments, the device 120 may request services from the device 140 directly. The device 120 may transmit a request message for information to the device 140, such as information provided by services from the device 140. The request message may be a signal associated with the ID of the device 140, a security key, or other relevant information. The device 140 responds in a service to the device 120. For example, the device 140 may identify that the device 120 requests the service through the associated ID. Accordingly, the devices 120 and 140 are able to establish direct communications with each other.

On the other hand, in direct discovery methods, the device 120 needs to listen to the existence of the device 140, and the device 140 needs to repeatedly transmits information regarding its existence to the device 120 in order to assist the device 120 to discovery the device 140. However, when the device 140 needs to transmit information frequently to the device 120, radio resources are wasted by the need for periodic beacon signalling. By contrast, in direct request methods, the device 120 sends the signal and the device 140 detects the signal to identify who is interested in the device 140. In this reversed manner compared to the direct discovery methods, only the resource for the transmission from the device 120 is required. For example, in one embodiment, the device 120 recognizes the device 140 is in proximity and requests connection to the device 140. The device 120 receives response from the device 140, and the device 120 connects to the device 140. In another embodiment, the device 140 may receive a request message for information from the device 120 designated for the device 140. The device 140 responds to the request message, and the device 140 connects to the device 120.

Figure 3:
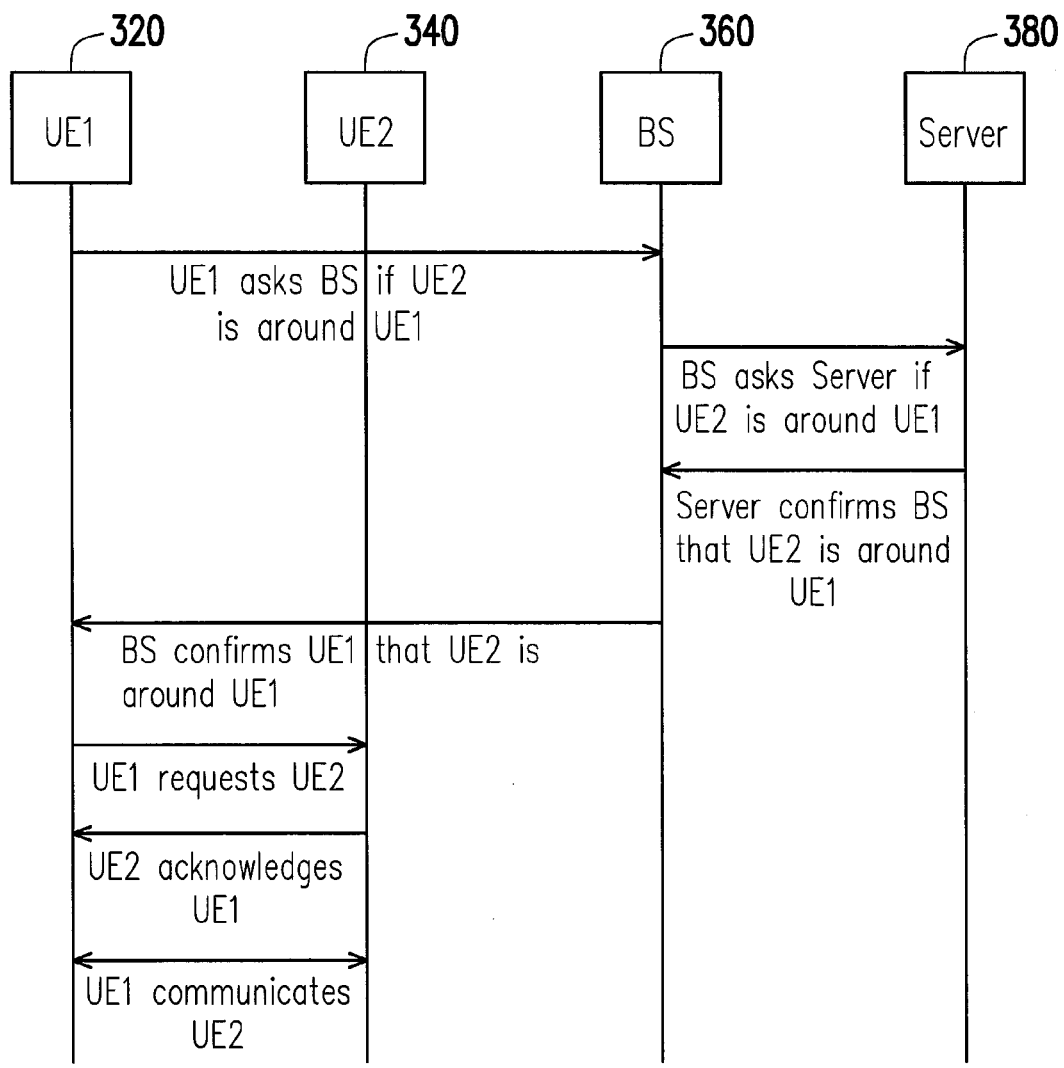
FIG. 3 is a flow diagram of a method for communication in a wireless network according to an exemplary embodiment.

FIG. 3 is a flow diagram of a method for communication in a wireless network according to an exemplary embodiment. In the network-assisted direct request communication method shown in FIG. 3, for example, a discovery device such as UE1 320 may ask one or more intermediate devices such as a BS 360 for a proximity information, such as whether a target device UE2 is in the proximity of the UE1 320. In the method according to the exemplary embodiment, the BS 360 asks a server 380 if UE2 360 is around UE1 320, and the server 380 may confirm to the BS 360 that UE2 340 is around UE1 320. The BS 360 may then confirm to the UE1 320 that the UE2 340 is around UE1 320. The BS 360 may also acknowledge to UE1 320 an associated discovery period that UE1 320 may discover the UE2 340. The wireless network may designate a discovery period for UE2 340 to listen and the UE1 320 to signal. However, a discovery period is not required, since UE2 340 or UE1 320 may broadcast its existence repeatedly. Direct communication can be established between UE1 320 and UE2 340 by UE1 320 sending a request access signal to UE2 340, or the UE2 340 sending a request access signal to UE1 320 announcing device existence and information for access.

Figure 4:
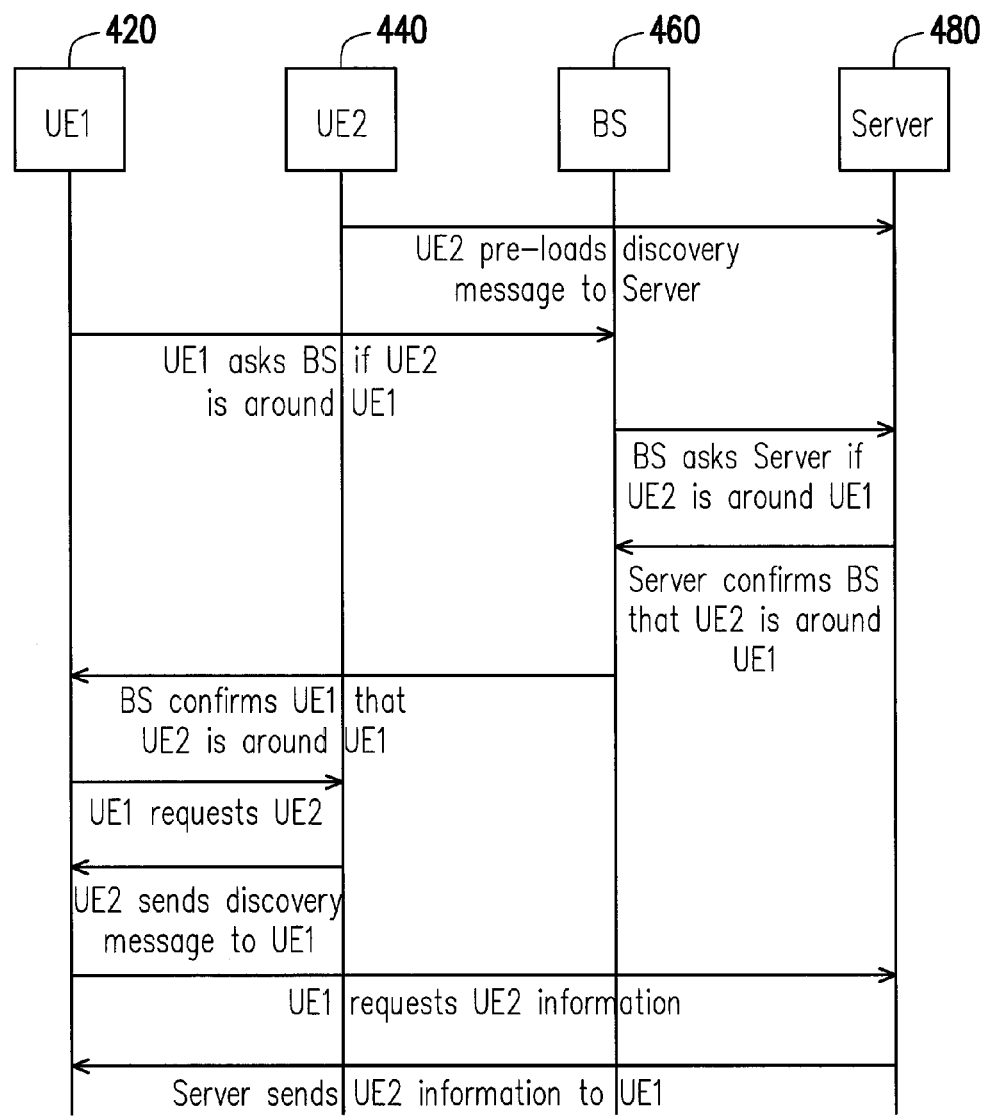
FIG. 4 is a flow diagram of another method for communication in a wireless network according to an exemplary embodiment.

Lawful interception may be required for operator-owned communication networks. Content interception and verification can be performed accordingly, discovery information and other pertinent data may need to be pre-stored to a server before a discovery process. FIG. 4 is a flow diagram of another method for communication in a wireless network according to an exemplary embodiment. In the method depicted by FIG. 4, an UE2 440 pre-loads a discovery message (i.e. a message to be transmitted for discovery) to a server 480. UE2 440 may also pre-load additional information related to UE2 440. An UE1 420 asks a BS 460 if UE2 440 is around UE1 420. BS 460 asks the server 480 if UE2 440 is in the proximity of UE1 420. The server 480 confirms to BS 460 that UE2 440 is around UE1 420. Moreover, BS 460 further confirms to UE1 420 that UE2 440 is around UE1 420. UE1 sends a request access signal to UE2 440. UE2 440 sends the discovery message to UE1 420. UE1 420 sends a request message for UE2 440 information to the server 480, and the server 480 sends UE2 440 information to UE1 420.

Figure 5:
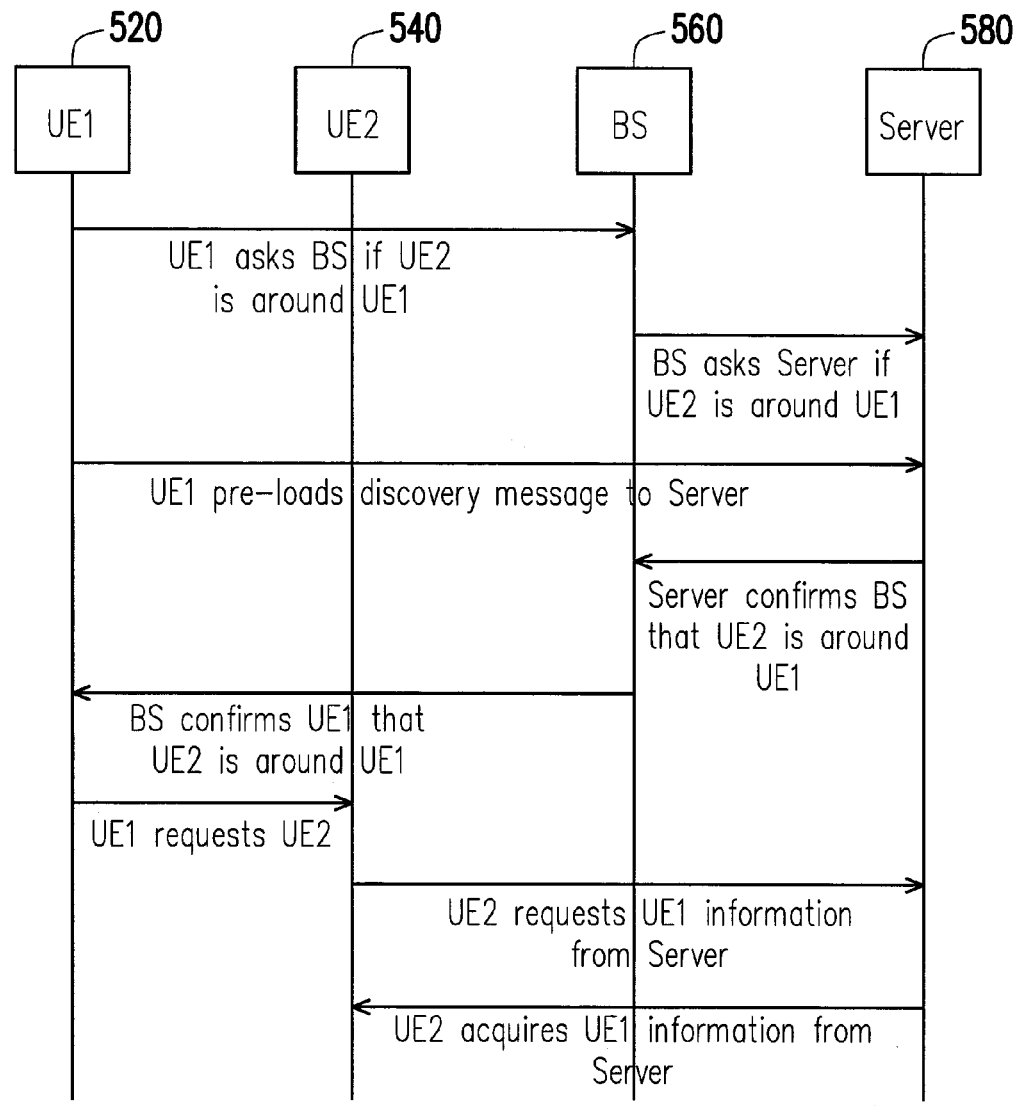
FIG. 5 is a flow diagram of another method for communication in a wireless network according to an exemplary embodiment.

FIG. 5 is a flow diagram of another method for communication in a wireless network according to an exemplary embodiment. In the method depicted by FIG. 5 according to the exemplary embodiment, an UE1 520 pre-loads the message to be transmitted for discovery to a server 580, and UE1 520 may further pre-load related information of UE1 520. An UE2 540 acquires information from the server 580. In the method, UE1 520 asks a BS 560 if UE2 540 is around UE1 520. BS 560 may then ask the server 580 if UE2 540 is around UE1 520. UE1 520 pre-loads a discovery message to the server 580. The server 580 confirms BS 560 that UE2 540 is around UE1 520. BS 560 may then confirm UE1 520 that UE2 540 is around UE1 520. UE1 520 sends a request access signal to UE2 540. UE2 540 sends a request message to the server 580 for information related to UE1 520 from the server 580. UE2 540 acquires information related to UE1 520 from the server 580.

Figure 6:
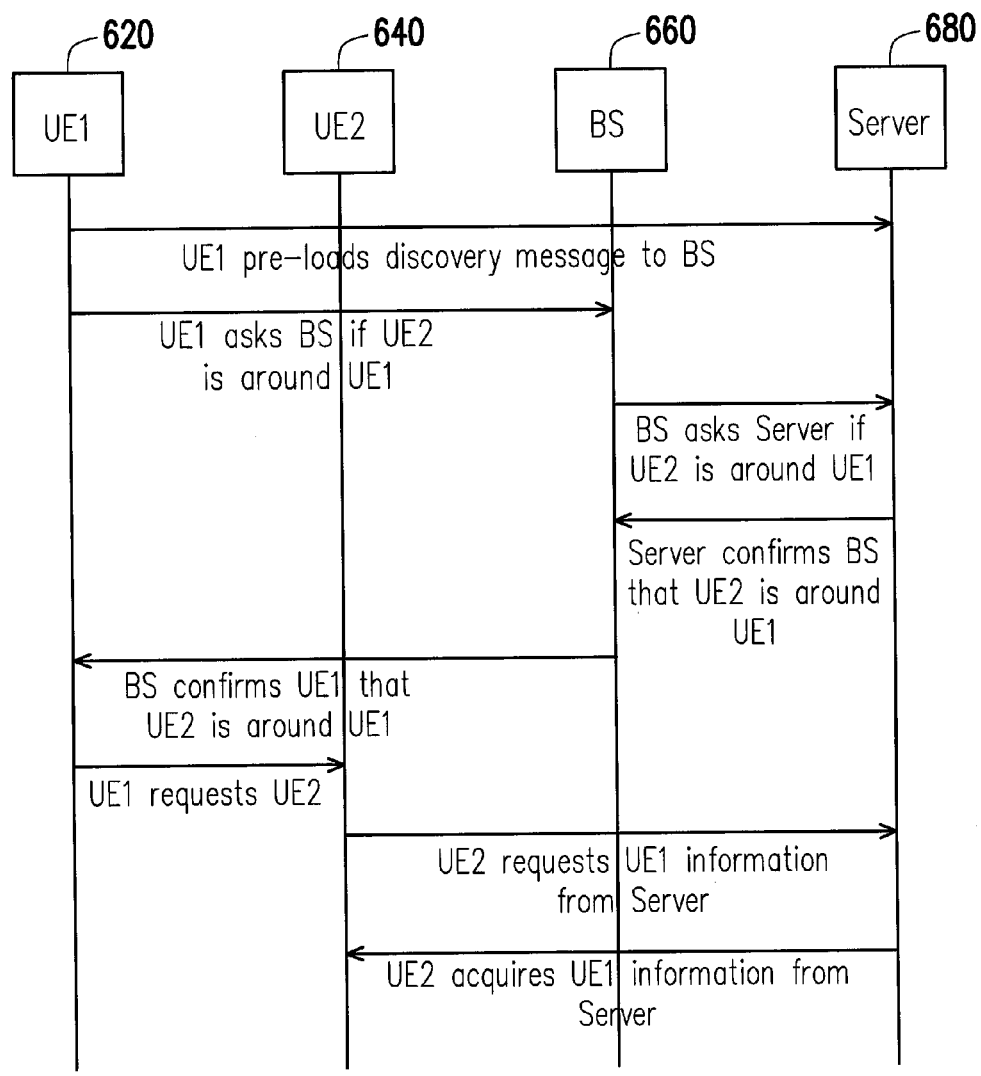
FIG. 6 is a flow diagram of another method for communication in a wireless network according to an exemplary embodiment.

FIG. 6 is a flow diagram of another method for communication in a wireless network according to an exemplary embodiment. In the method depicted by FIG. 6 according to the exemplary embodiment, an UE1 620 pre-loads a discovery message to a BS 660. UE1 620 asks the BS 660 if an UE2 640 is around UE1 620. BS 660 then asks a server 680 if UE2 640 is in the proximity of UE1 620. The server 680 may confirm BS 660 that UE2 640 is around UE1 620. BS 660 then confirms to UE1 620 that UE2 640 is around UE1 620. UE1 620 sends a request access signal to UE2 640. UE2 640 sends a request message to the server 680 for information related to UE1 620 from the server 680. UE2 640 acquires information related to UE1 620 from the server 680.

Figure 7:
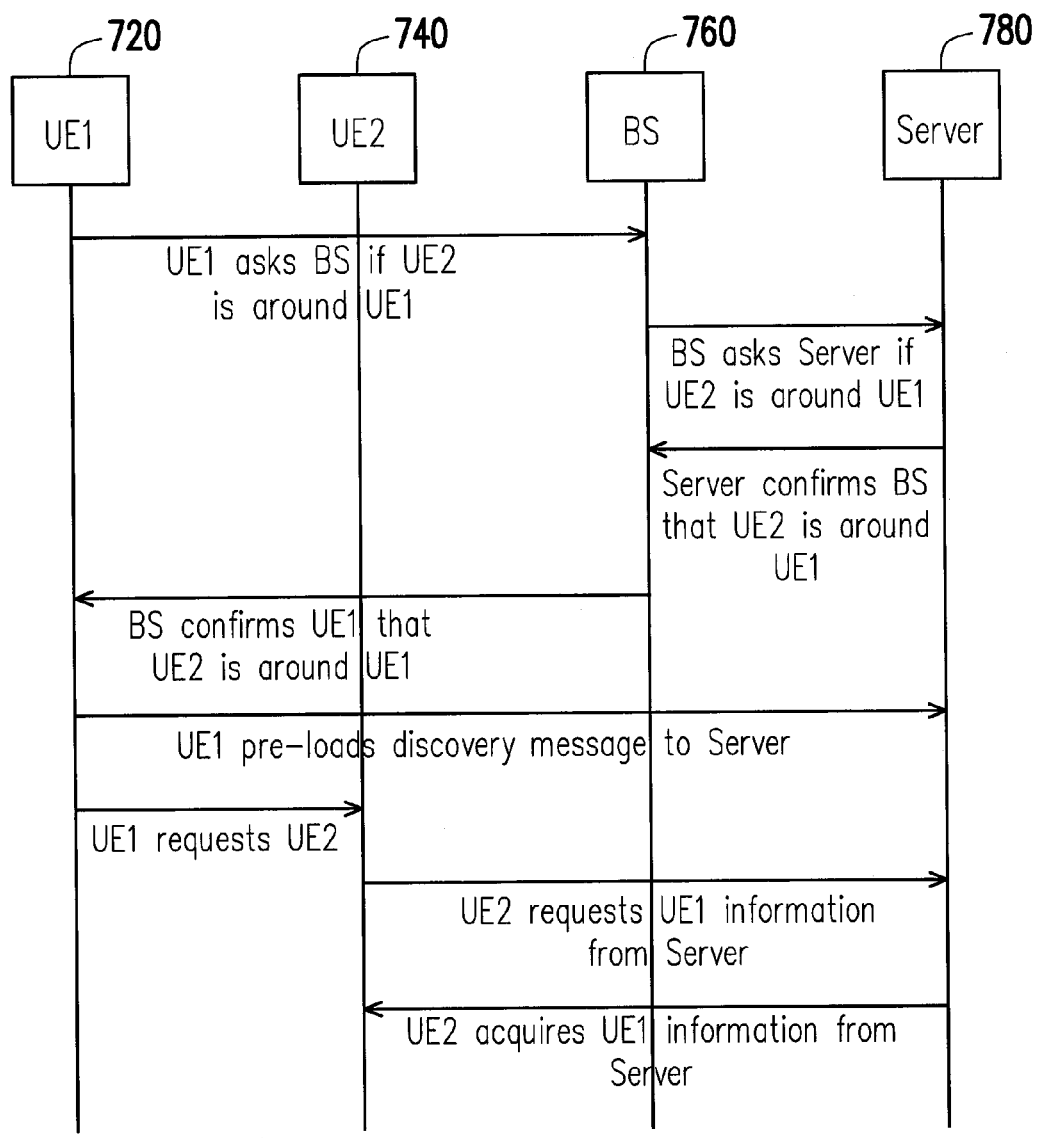
FIG. 7 is a flow diagram of another method for communication in a wireless network according to an exemplary embodiment.

FIG. 7 is a flow diagram of another method for communication in a wireless network according to an exemplary embodiment. In the method depicted by FIG. 7 according to the exemplary embodiment, an UE1 720 asks a BS 760 if an UE2 740 is around UE1 720. BS 760 then asks a server 780 if UE2 740 is in the proximity of UE1 720. The server 780 may confirm BS 760 that UE2 740 is around UE1 720. BS 760 then confirms to UE1 720 that UE2 740 is around UE1 720. UE1 720 pre-loads a discovery message to the server 780. Moreover, UE1 720 sends a request access signal to UE 740. UE2 740 sends a request message to the server 780 for information related to UE1 720 from the server 780. UE2 740 acquires information related to UE1 720 from the server 780.

Figure 8:
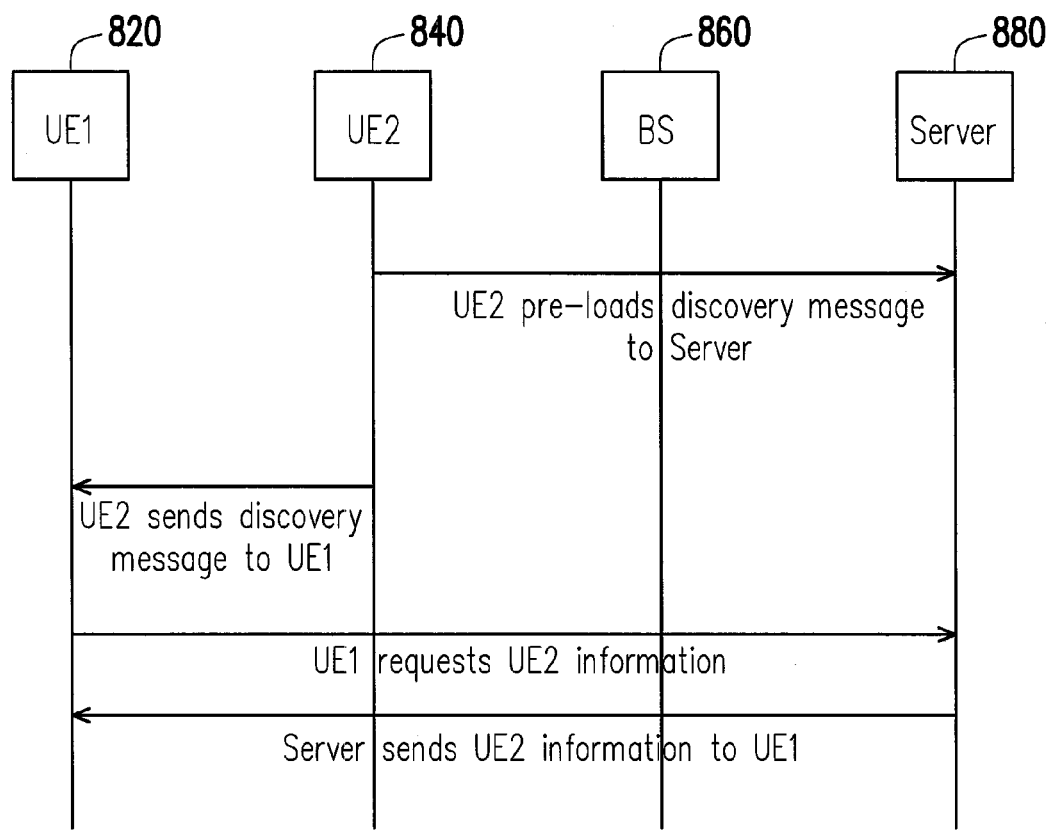
FIG. 8 is a flow diagram of another method for communication in a wireless network according to an exemplary embodiment.

FIG. 8 is a flow diagram of another method for communication in a wireless network according to an exemplary embodiment. In the method depicted by FIG. 8 according to the exemplary embodiment, an UE2 840 pre-loads a discovery message to a server 880. UE2 may then send the discovery message to an UE1 820. UE1 820 sends a request message to the server 880 for information related to UE2 840 from the server 880. The server 880 then sends information related to UE2 840 to UE1 820.

It should be appreciated that, the distance between the communication devices depicted in FIGS. 1 and 3-8 may be determined according to a transmission characteristic. In some embodiments, the transmission characteristic is a received power strength, an associated transmitted power level, or a transmission time. For instance, the communication devices may be in proximity with each other when the received power strength detected with the same transmitted power is greater a predetermined level, for example. Moreover, when the transmission time is longer than a predetermined time interval, the distance between the communication devices may not be in proximity with each other.

In addition, in the methods described according to the exemplary embodiments, the server may determine whether the request message contains a verifiable key. The verifiable key may be a predetermined keyword or a combination of keywords, for example. When the request message for information contains the verifiable key, transmission of the information related to the one or more communication devices is allowed prior to the discovery period. Accordingly, the communication device sending the request message with the verifiable key to the server is allowed to perform direct communications, and the server would be able to register the associated information. Furthermore, the same or different verifiable keys may be required from request messages transmitted by different communication devices.

Figure 9:
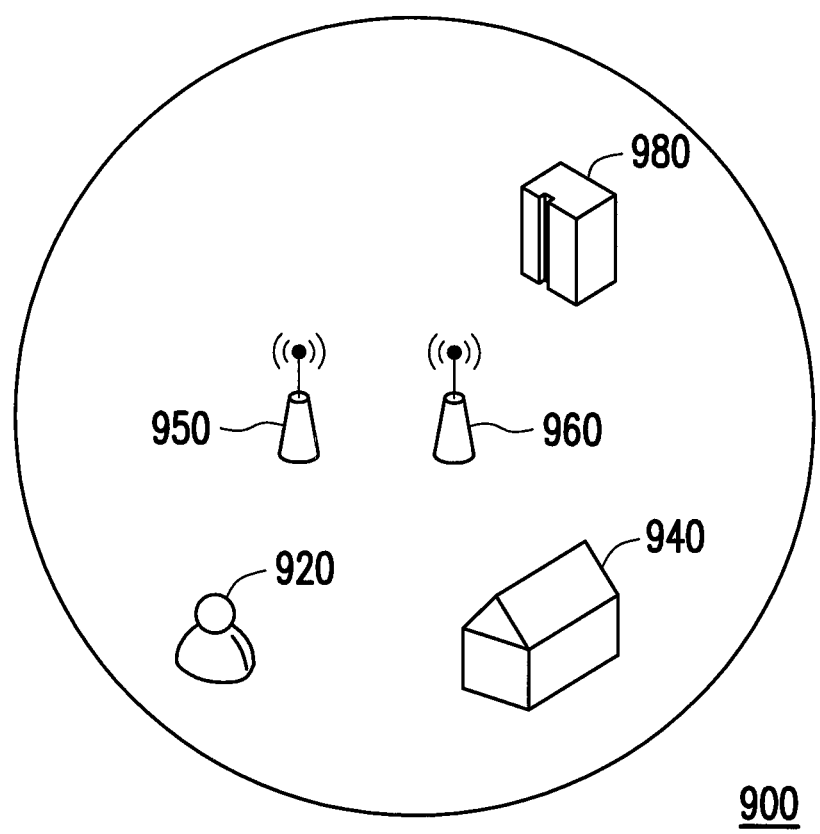
FIG. 9 is a schematic view of another example system implementing a method for communication in a wireless network according to an exemplary embodiment.

It should be further appreciated that the communication devices may communicate with each other through different intermediate devices, such as by a local switching technique described hereafter. FIG. 9 is a schematic view of another example system implementing a method for communication in a wireless network according to an exemplary embodiment. Referring to FIG. 9, the devices 920 and 940 may communicate with each other through the intermediate devices 950 and 960. In one example, the device 940 may pre-load data to a server 980 through the intermediate device 960, and the device 920 may send a request message to the server 980 through the intermediate device 950. The server 980 may send the needed information to the device 920 or the device 940 through the intermediate device 950 or 960, and communication can be established between devices 920 and 940 through the local switching of the intermediate device 950 or 960.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for communication in a wireless network, comprising:
    one or more discovery devices executing at least steps comprising:
    transmitting a request message for information to one or more target devices; and
    receiving an information related to the one or more target devices, for establishing a communication link between at least one pair of discovery devices and target devices,
    wherein a discovery period is designated by the wireless network, the one or more discovery devices transmitting to a server the request message and an information related to the one or more discovery devices prior to the discovery period, the one or more target devices transmitting to the server the information related to the one or more target devices prior to the discovery period, the one or more discovery devices transmitting the request for information to the one or more target devices during the discovery period, and the one or more discovery devices receiving the information related to the one or more target devices during the discovery period, wherein the server determines whether the request message contains a verifiable key which is a predetermined keyword or a combination of keywords to allow transmission of the information related to the one or more target devices prior to the discovery period.

2. The method of claim 1, further comprising:
    obtaining a proximity information between the at least one pair of discovery devices and target devices from the server.

3. The method of claim 1, further comprising:
    obtaining a proximity information between the at least one pair of discovery devices and target devices from one or more intermediate devices.

4. The method of claim 3, further comprising:
    transmitting information destined to the one or more discovery devices to the server through the one or more intermediate devices.

5. The method of claim 3, further comprising:
    transmitting information destined to the one or more target devices to the server through the one or more intermediate devices.

6. The method of claim 3, wherein the one or more discovery devices and the one or more target devices communicate with the server through different intermediate devices.

7. The method of claim 1, wherein a distance between the one or more discovery devices and the one or more target devices is determined according to a transmission characteristic,
    wherein the transmission characteristic is a received power strength, a transmitted power level, or a transmission time.

8. The method of claim 1, further comprising:
    obtaining a proximity information between the at least one pair of discovery devices and target devices from the server.

9. The method of claim 1, further comprising:
    obtaining a proximity information between the at least one pair of discovery devices and target devices from one or more intermediate devices.

10. The method of claim 9, further comprising:
    transmitting information destined to the one or more discovery devices to the server through the one or more intermediate devices.

11. The method of claim 9, further comprising:
    transmitting information destined to the one or more target devices to the server through the one or more intermediate devices.

12. The method of claim 9, wherein the one or more discovery devices and the one or more target devices communicate with the server through different intermediate devices.

13. The method of claim 1, wherein the one or more discovery devices transmits the request for information to the one or more target devices during the discovery period, and the one or more discovery devices receives the information related to the one or more target devices during the discovery period.

14. The method of claim 1, wherein a distance between the one or more discovery devices and the one or more target devices is determined according to a transmission characteristic,
    wherein the transmission characteristic is a received power strength, a transmitted power level, or a transmission time.

15. A discovery device, comprising:
    a communication protocol module transmitting a request message for information to one or more target devices, and receiving an information related to the one or more target devices, for establishing a communication link between at least one pair of discovery devices and target devices,
    wherein a discovery period is designated by a wireless network, the communication protocol module is configured to transmit to a server the request message and an information related to the one or more discovery devices prior to the discovery period, and the one or more target devices transmits to the server the information related to the one or more target devices prior to the discovery period, and the communication protocol module is further configured to transmit the request for information to the one or more target devices during the discovery period, and receive the information related to the one or more target devices during the discovery period, wherein the server determines whether the request message contains a verifiable key which is a predetermined keyword or a combination of keywords to allow transmission of the information related to the one or more target devices prior to the discovery period.

16. The discovery device of claim 15, wherein the communication protocol module is further configured to obtain a proximity information between the at least one pair of discovery devices and target devices from the server.

17. The discovery device of claim 15, wherein the communication protocol module is further configured to obtain a proximity information between the at least one pair of discovery devices and target devices from one or more intermediate devices.

18. he discovery device of claim 17, wherein the one or more target devices is configured to transmit information destined to the discovery device to the server through the one or more intermediate devices.

19. The discovery device of claim 17, wherein the communication protocol module is further configured to transmit information destined to the one or more target devices to the server through the one or more intermediate devices.

20. The discovery device of claim 17, wherein the discovery device and the one or more target devices communicate with the server through different intermediate devices.

21. The discovery device of claim 15, wherein a distance between the discovery device and the one or more target devices is determined according to a transmission characteristic,
wherein the transmission characteristic is a received power strength, a transmitted power level, or a transmission time.

22. The discovery device of claim 15, wherein the communication protocol module is further configured to obtain a proximity information between the at least one pair of the discovery devices and target devices from the server.

23. The discovery device of claim 15, wherein the communication protocol module is further configured to obtain a proximity information between the at least one pair of discovery devices and target devices from one or more intermediate devices.

24. The discovery device of claim 23, wherein the one or more target devices is configured to transmit information destined to the discovery device to the server through the one or more intermediate devices.

25. The discovery device of claim 23, wherein the communication protocol module is further configured to transmit information destined to the one or more target devices to the server through the one or more intermediate devices.

26. The discovery device of claim 23, wherein the discovery device and the one or more target devices communicate with the server through different intermediate devices.

27. The discovery device of claim 15, wherein the communication protocol module is further configured to transmit the request for information to the one or more target devices during the discovery period, and receive the information related to the one or more target devices during the discovery period.

28. The discovery device of claim 15, wherein a distance between the discovery device and the one or more target devices is determined according to a transmission characteristic,
wherein the transmission characteristic is a received power strength, a transmitted power level, or a transmission time.

29. A method for communication in a wireless network, comprising:
one or more target devices executing at least steps comprising:
receiving a request message for information; and
transmitting to one or more discovery devices an information related to the one or more target devices, for establishing a communication link between at least one pair of discovery devices and target devices,
wherein a discovery period is designated by the wireless network, the one or more discovery devices transmitting to a server the request message and an information related to the one or more discovery devices prior to the discovery period, the one or more target devices transmitting to the server the information related to the one or more target devices prior to the discovery period, the one or more target devices receiving the request for information during the discovery period, and the one or more target devices transmitting the information related to the one or more target devices during the discovery period,
wherein the server determines whether the request message contains a verifiable key which is a predetermined keyword or a combination of keywords to allow transmission of the information related to the one or more target devices prior to the discovery period.

30. method of claim 29, further comprising:
obtaining a proximity information between the at least one pair of discovery devices and target devices from the server.

31. The method of claim 29, further comprising:
obtaining a proximity information between the at least one pair of discovery devices and target devices from one or more intermediate devices.

32. The method of claim 31, further comprising:
transmitting information destined to the one or more discovery devices to the server through the one or more intermediate devices.

33. The method of claim 31, further comprising:
transmitting information destined to the one or more target devices to the server through the one or more intermediate devices.

34. The method of claim 31, wherein the one or more discovery devices and the one or more target devices communicate with the server through different intermediate devices.

35. The method of claim 29, wherein a distance between the one or more target devices and the one or more discovery devices is determined according to a transmission characteristic,
wherein the transmission characteristic is a received power strength, a transmitted power level, or a transmission time.

36. A method for communication in a wireless network, comprising:
one or more intermediate devices executing at least steps comprising:
transmitting a request message for information to one or more target devices; and
transmitting a proximity information to one or more discovery devices,
wherein a discovery period is designated by the wireless network, the one or more discovery devices transmitting to a server the request message and an information related to the one or more discovery devices prior to the discovery period, the one or more target devices transmitting to the server the information related to the one or more target devices prior to the discovery period, the one or more target devices receiving the request for information during the discovery period, and transmitting the proximity information during the discovery period,
wherein the server determines whether the request message contains a verifiable key which is a predetermined keyword or a combination of keywords to allow transmission of the information related to the one or more target devices prior to the discovery period.

37. The method of claim 36, further comprising:
obtaining the proximity information from the server.

38. The method of claim 36, further comprising:
transmitting information destined to the one or more discovery devices to the server.

39. The method of claim 36, further comprising:
transmitting information destined to the one or more target devices to the server.

40. The method of claim 36, wherein a distance between the one or more target devices and the one or more discovery devices is determined according to a transmission characteristic,
wherein the transmission characteristic is a received power strength, a transmitted power level, or a transmission time.

41. The method of claim 36, wherein the one or more discovery devices and the one or more target devices communicate with the server through different intermediate devices.

42. A method for communication in a wireless network, wherein a discovery period is designated by the wireless network, the method comprising:
one or more discovery devices transmitting to a server a request message and an information related to the one or more discovery devices prior to the discovery period; and
one or more target devices transmitting to the server an information related to the one or more target devices prior to the discovery period, wherein the server determines whether the request message contains a verifiable key which is a predetermined keyword or a combination of keywords to allow transmission of the information related to the one or more target devices prior to the discovery period, wherein the one or more discovery devices transmits a request for information to the one or more target devices during the discovery period, and the one or more discovery devices receives the information related to the one or more target devices during the discovery period.

43. The method of claim 42, further comprising:
the one or more target devices transmitting a request message for proximity information to one or more intermediate devices; and
the one or more intermediate devices transmitting the request message for proximity information to the server.

44. The method of claim 42, further comprising:
transmitting information destined to the one or more discovery devices to the server through one or more intermediate devices.

45. The method of claim 42, further comprising:
transmitting information destined to the one or more target devices to the server through one or more intermediate devices.

46. The method of claim 42, wherein a distance between the one or more discovery devices and the one or more target devices is determined according to a transmission characteristic,
wherein the transmission characteristic is a received power strength, a transmitted power level, or a transmission time.

47. The method of claim 42, wherein the one or more discovery devices and the one or more target devices communicate with the server through different intermediate devices.

48. A discovery device for communication in a wireless network, wherein a discovery period is designated by the wireless network, the discovery device comprising:
a communication protocol module transmitting to a server a request message and an information related to the discovery device prior to the discovery period, and transmitting to the server an information related to one or more target devices prior to the discovery period, wherein the server determines whether the request message contains a verifiable key which is a predetermined keyword or a combination of keywords to allow transmission of the information related to the one or more target devices prior to the discovery period, wherein the communication protocol module is further configured to transmit a request for information to the one or more target devices during the discovery period, and the discovery device receives the information related to one or more target devices during the discovery period.

49. The discovery device of claim 48, wherein the communication protocol module is further configured to transmit a request message for proximity information to one or more intermediate devices.

50. The discovery device of claim 48, wherein the one or more target devices is configured to transmit information destined to the discovery device to the server through one or more intermediate devices.

51. The discovery device of claim 48, wherein the communication protocol module is further configured to transmit information destined to the one or more target devices to the server through one or more intermediate devices.

52. The discovery device of claim 48, wherein a distance between the one or more discovery devices and the one or more target devices is determined according to a transmission characteristic,
wherein the transmission characteristic is a received power strength, a transmitted power level, or a transmission time.

53. The discovery device of claim 48, wherein the discovery device and the one or more target devices communicate with the server through different intermediate devices.

* * * * *